United States Patent
Peterman et al.

(10) Patent No.: US 11,635,258 B2
(45) Date of Patent: *Apr. 25, 2023

(54) EXHAUST HOOD OVERFLOW SYSTEM

(71) Applicant: GPRE IP, LLC, St. Louis, MO (US)

(72) Inventors: John M. Peterman, Troy, MO (US); Mark A. Roberts, St. Charles, MO (US)

(73) Assignee: GPRE IP, LLC, St. Louis, MO (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/382,082

(22) Filed: Jul. 21, 2021

(65) Prior Publication Data
US 2022/0026150 A1 Jan. 27, 2022

Related U.S. Application Data

(60) Provisional application No. 63/054,984, filed on Jul. 22, 2020.

(51) Int. Cl.
*F27D 17/00* (2006.01)
(52) U.S. Cl.
CPC ................................. *F27D 17/002* (2013.01)

(58) Field of Classification Search
None
See application file for complete search history.

(56) References Cited

U.S. PATENT DOCUMENTS

| | | | |
|---|---|---|---|
| 3,869,112 A * | 3/1975 | Habayeb | F27D 17/001 266/200 |
| 2022/0001340 A1* | 1/2022 | Peterman | F15B 21/04 |
| 2022/0026150 A1* | 1/2022 | Peterman | F27D 21/00 |
| 2022/0034588 A1* | 2/2022 | Peterman | F27D 7/04 |

* cited by examiner

*Primary Examiner* — Scott R Kastler
(74) *Attorney, Agent, or Firm* — Douglas D. Churovich, Esq.; Churovich Law, LLC

(57) ABSTRACT

An overflow system for a doorway exhaust hood on a metal melt furnace having an eductor gas circulator. The system includes a manifold with an inlet near the hood's lower lip, and a conduit between the manifold and eductor. A blower draws gas into the manifold and urges that gas through the conduit, into the eductor, and into the furnace. Sensors detect when the door is open and the volatiles level under the hood. An electronic controller instructs the blower to draw exhaust gases through the manifold when the door is open and the volatiles level exceeds a predetermined level.

20 Claims, 7 Drawing Sheets

EXHAUST HOOD OVERFLOW SYSTEM

CROSS REFERENCE TO RELATED APPLICATIONS

This application derives and claims priority from U.S. provisional application 63/054,984 filed 22 Jul. 2020, which application is incorporated herein by reference.

STATEMENT REGARDING FEDERALLY SPONSORED RESEARCH OR DEVELOPMENT

Not applicable.

BACKGROUND OF THE INVENTION

This invention relates principally to an exhaust fume overflow apparatus for a metal furnace or kiln, and more particularly to an evacuated hood overflow system for a coated scrap melting furnace that collects excess organic and particulate volatiles off-gassing from coated metal scrap that exits the furnace doorway and overwhelms the doorway hood when the doorway is opened, and redirects such fumes into the furnace to burn as fuel and reduce pollutant emissions from the furnace.

It has for some time been a standard practice to recycle scrap metals, and in particular scrap aluminum. Various furnace and kiln systems exist that are designed to recycle and recover aluminum from various sources of scrap, such as used beverage cans ("UBC"), siding, windows and door frames, etc. One of the first steps in these processes is to use a rotary kiln to volatize and remove the paints, oils, and other surface materials (i.e., volatile organic compounds or "VOC's") on the coated scrap aluminum (i.e. "feed material"). This is commonly known in the industry as "delacquering." Delacquering is typically performed in a chamber with an atmosphere having reduced Oxygen levels and with temperatures in excess of 900 degrees Fahrenheit. However, the temperature range at which the paints and oils and other surface materials are released from the aluminum scrap in the form of unburned volatile gases typically ranges between 450 and 600 degrees Fahrenheit, which is generally known as the "volatilization point" or "VOL." The volatizing or delacquering chamber may be run as hot as 900 degrees Fahrenheit to ensure that sufficient heat is transferred throughout the scrap load to achieve an internal temperature of at least 450 degrees Fahrenheit.

In various such metal recycling systems, the furnace comprises multiple compartments or chambers to accommodate serial steps in the recycle process. For example, for aluminum scrap that is coated with paints and various other surface materials, it is typical to remove such coatings from the scrap aluminum before the aluminum is actually melted. Thus, in a simplistic model, such an aluminum recycle system will require at least two chambers—one for delacquering and one for actual melt purposes. In at least one version of such a furnace, after delacquering the scrap metal becomes part of a melt flow that circulates between the delacquering and melt chambers. This allows new scrap metal to be placed in the melt flow and melted, while previously melted scrap can be siphoned off from the same recirculating flow.

Traditional aluminum delacquering-melt furnaces that seek to utilize the VOC's for fuel simply collect and route the VOC's from the interior of the scrap metal delacquering chamber and funnel them into the melt chamber using electric fans positioned in air ducts. However, it has been found that large amounts of VOC's can escape the delacquering chamber out the gate or doorway through which the scrap metal is inserted, that such a large amount escaping VOC's tend to overwhelm the standard exhaust hood placed above the gate or doorway, and that traditional internal recapture systems do not prevent an overflow of VOC's around the standard doorway exhaust hood.

While larger or more powerful exhaust vent hoods could be positioned above the gate or doorway, such a remedy would greatly increase the cost of the system and greatly expand the spacial footprint of the system—both of which would be unwelcome. It would therefore be desirable to have an apparatus or system for an aluminum melt furnace that could collect excess VOC's that escape from the gate or doorway and overwhelm the overhead exhaust hood. As will become evident in this disclosure, the present invention provides such benefits over the existing art.

BRIEF DESCRIPTION OF THE DRAWINGS

The illustrative embodiments of the present invention are shown in the following drawings which form a part of the specification.

Corresponding reference characters indicate corresponding parts throughout the several views of the drawings.

DETAILED DESCRIPTION

Figure 1:
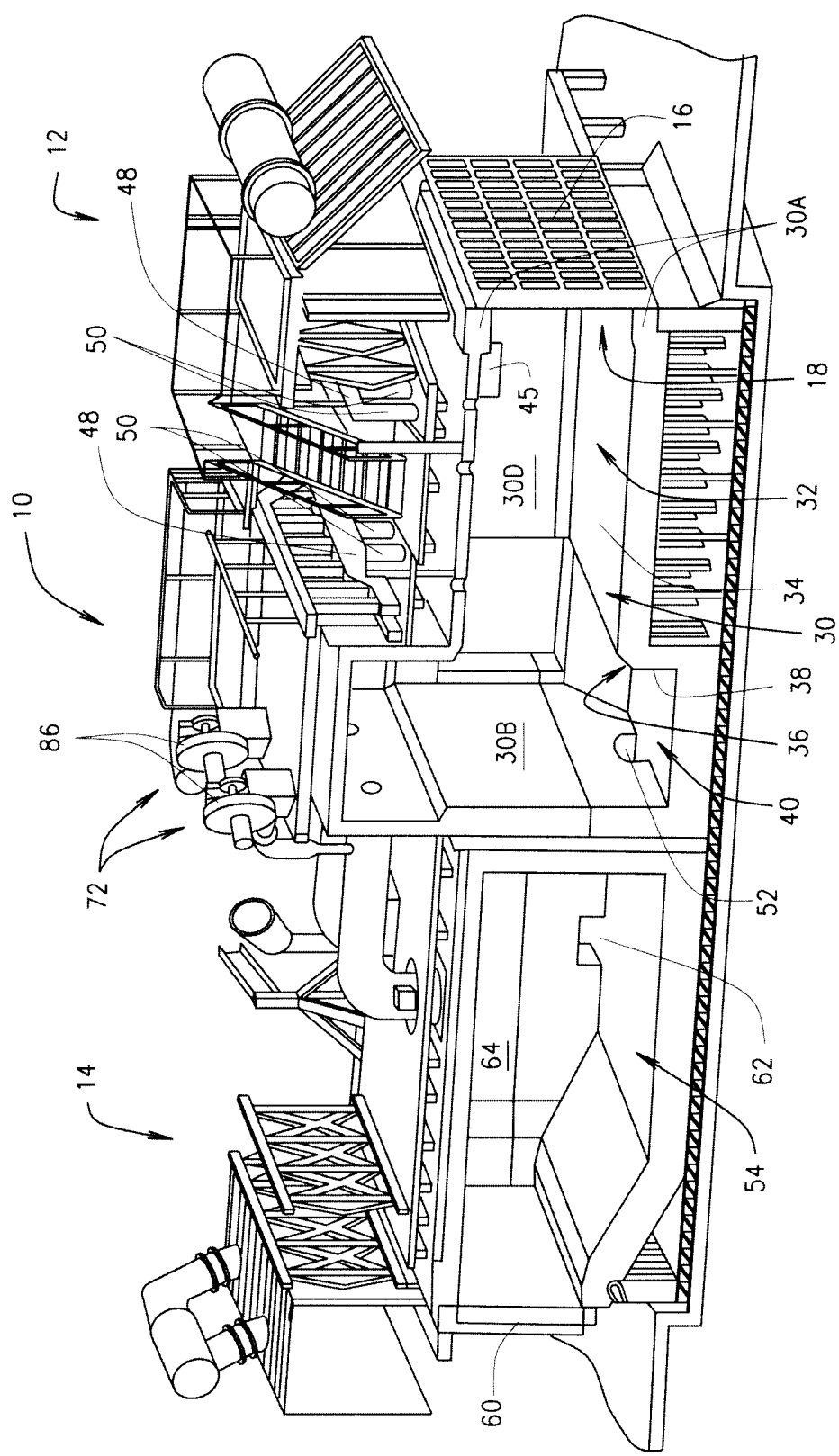
FIG. 1 is a perspective cross-sectional view of a scrap aluminum melt furnace with a delacquering chamber.
Figure 2:
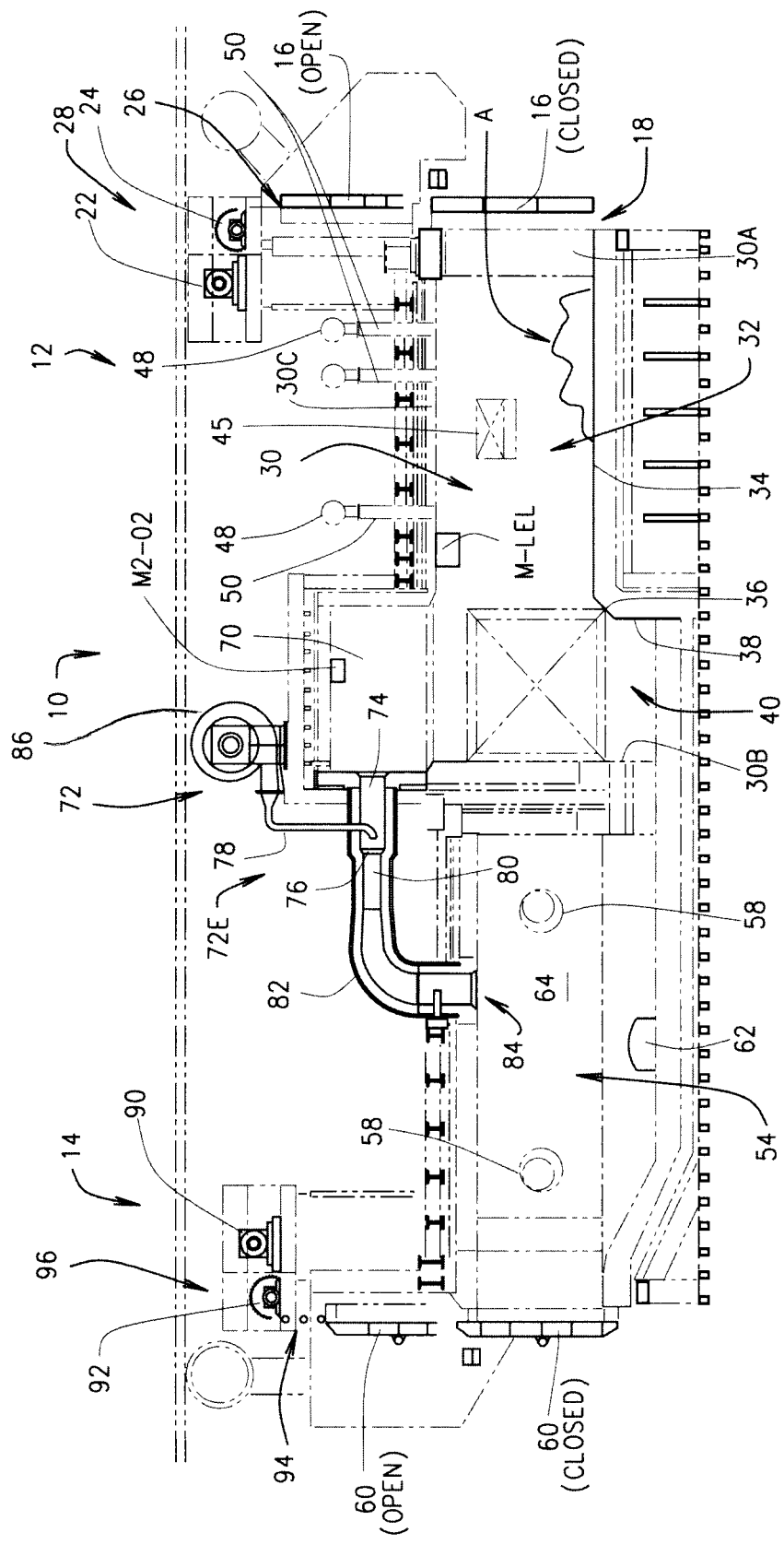
FIG. 2 is a partially diagrammatic cross-sectional plan view of the scrap aluminum melt furnace of FIG. 1.

In referring to the drawings, an embodiment of a representative scrap aluminum delacquering and melt furnace 10 is shown generally in FIGS. 1-4, where the novel exhaust hood overflow system 100 of the present invention is depicted by way of example as integrated into the furnace 10.

As can be seen, the furnace 10 has a front end 12 and a back end 14 opposite the front end 12. A vertical, rectangular steel gate or door 16 is positioned, when closed, against a doorway 18 in the front end 12 of the furnace 10. The door 16 is approximately twenty-two feet wide and ten feet tall, and one foot thick. An electric lift motor 22 and associated lift gears 24, are positioned above the door 16 atop the front end of the furnace 10. A set of heavy chains 26 attach at one end to the door 16 and attach at the other end to the lift gears 24. The motor 22, lift gears 24 and chains 26 collectively form an opening system 28 for the door 16. A computer control system CCS for the furnace 10 operatively communicates with the opening system 28 to controllably raise and lower the door 16 between its closed position (as depicted in FIG. 1 and denoted in FIG. 2 as "CLOSED"), in which the door 16 rests against and seals the doorway 18, and its open position in which the door 16 fully exposes the doorway 18 (as depicted and denoted in FIG. 2 as "OPEN").

The doorway 18 opens into a large, generally rectangular delacquering or volatizinq or coated scrap chamber 30 constructed of steel and various refractory materials. The delacquering chamber 30 has a vertical front wall 30A having dimensions of approximately 9 foot high by 24 foot wide, a vertical rear wall 30B opposite the front wall 30A having dimensions of approximately 16 foot high by 24 foot wide, a horizontal ceiling 30C having dimensions of approximately 31 foot deep by 24 foot wide, a first vertical sidewall 30D having dimensions of approximately 9 foot high by 31 foot wide, and a second vertical sidewall 30E opposite the sidewall 30D likewise having dimensions of approximately 9 foot high by 31 foot wide. The front wall 30A includes the doorway 18 and the gate 16.

The delacquering chamber 30 further has a delacquering zone or volatizing zone 32 that is approximately twenty feet wide by ten feet tall, and extends approximately twenty feet into the chamber 30 from the doorway 18. The delacquering zone 32 has a relatively flat floor 34 that extends at a slight incline downward from the doorway 18 to a one-foot wide beveled lip 36 that crosses the far end of the floor 34 opposite the doorway 18. Scrap aluminum A is loaded through the doorway 18 onto the floor 34 for initial processing in the chamber 30. The lip 36 slopes downward from the floor 34 at an angle of approximately 45 degrees to a vertical wall 38 that forms the front end of a depressed, generally rectangular pool, known as a "creek bed" 40, at the end of the delacquering chamber 30. The creek bed 40 is approximately two feet deep, twenty feet long and ten feet wide. The creek bed 40 terminates at the vertical rear wall 30B.

Figure 3:
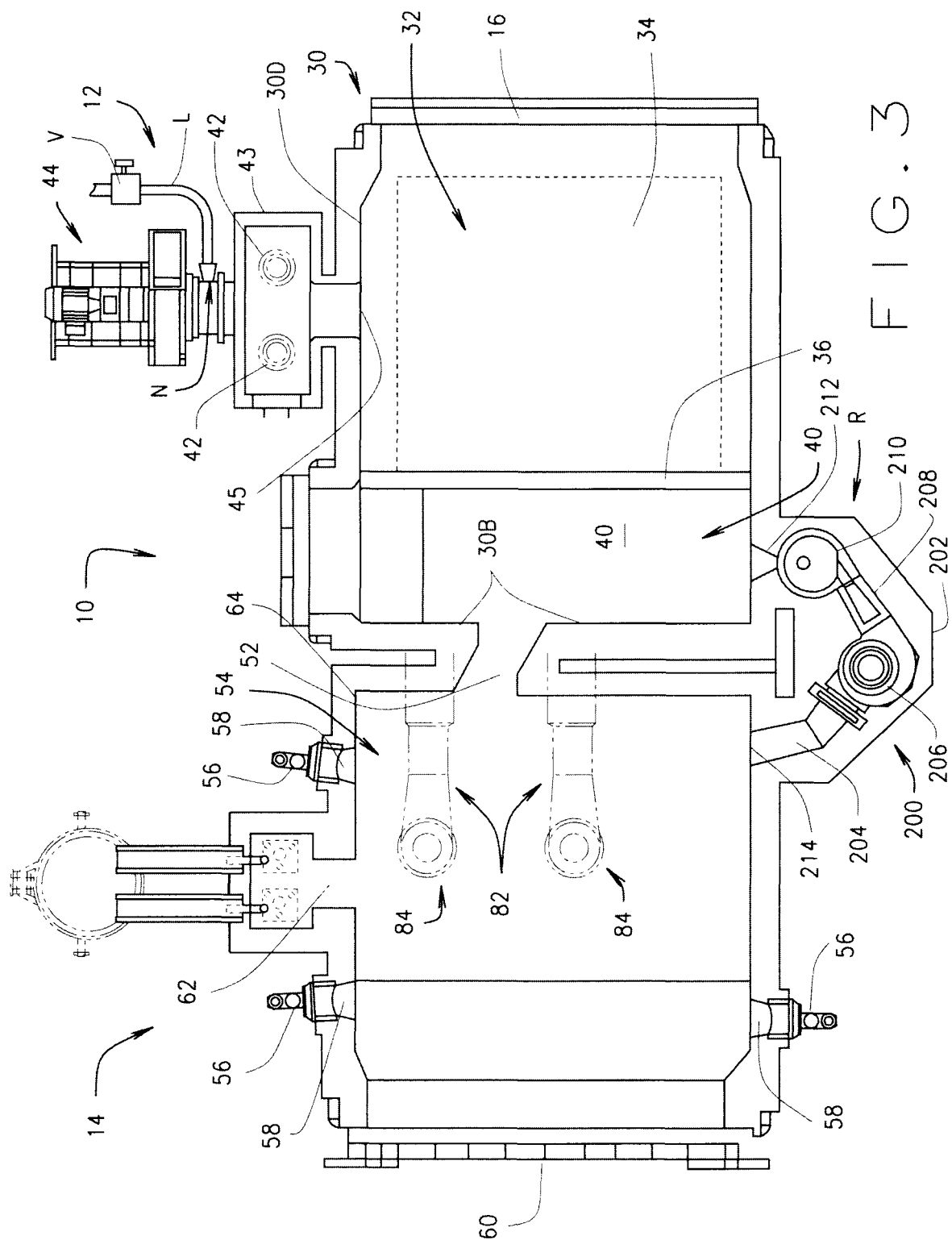
FIG. 3 is a top view of the scrap aluminum melt furnace of FIG. 1.
Figure 4:
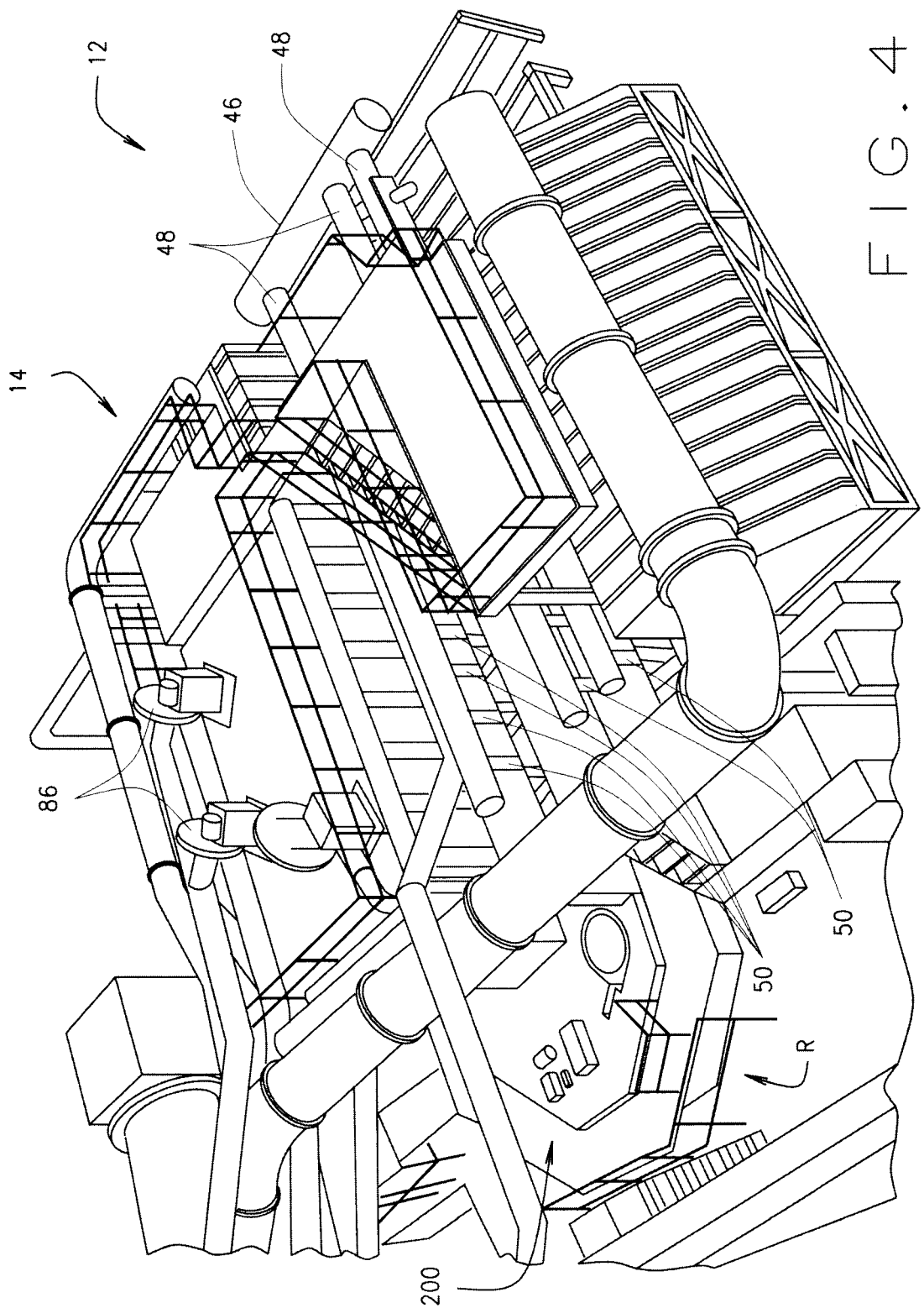
FIG. 4 is an alternate top front perspective view of the front end of the scrap aluminum melt furnace of FIG. 1.
Figure 5:
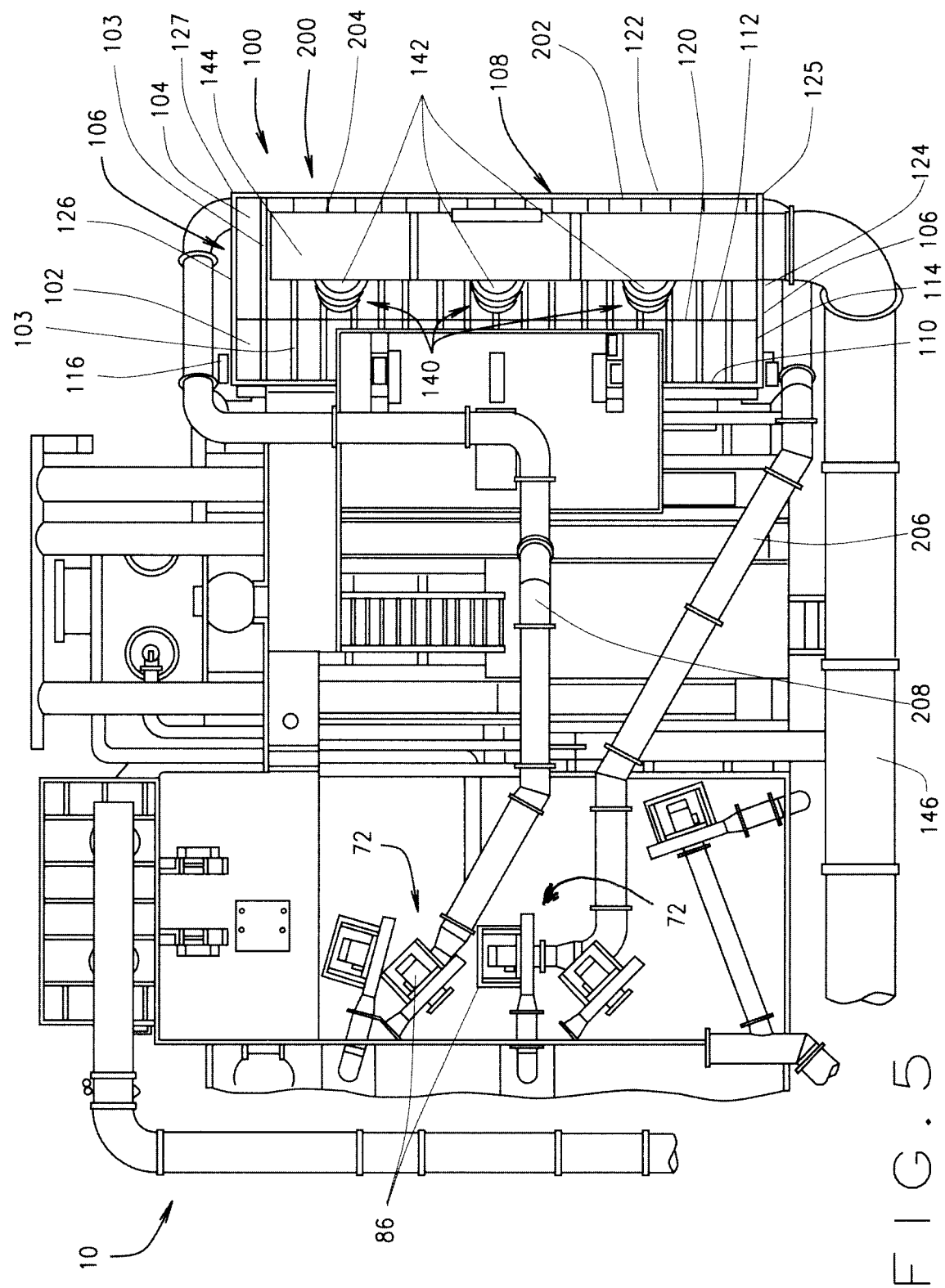
FIG. 5 is a top view of a first embodiment of the exhaust hood overflow system of the present invention incorporated into the furnace of FIG. 1.
Figure 6:
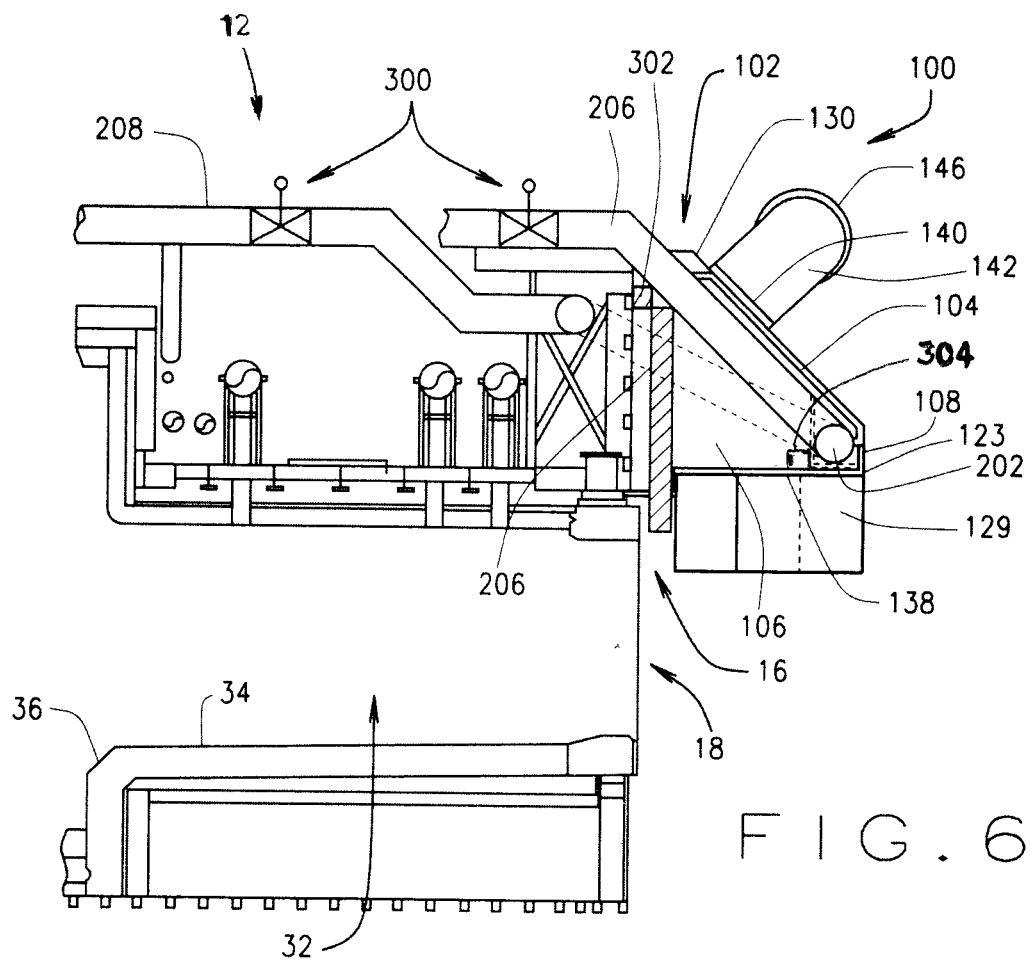
FIG. 6 is a cross-sectional side view of the first embodiment of the exhaust hood overflow system of FIG. 5.

Referring to FIGS. 3 and 4, it can be seen that a set of gas burners 42, associated with a hot gas generator 43, and a recirculation burner fan 44, are positioned outside the delacquering chamber 30 adjacent the vertical sidewall 30D. The gas burners 42 are positioned on top of, and extend partially into, the hot gas generator 43, such that the heat generated by the gas burners 42 is directed downward into the hot gas generator 43. The recirculation fan 44 draws gases from the delacquering chamber 30 through a square opening 45 in the middle of the sidewall 30D, and into the hot gas generator 43, where they are heated to approximately 1000 degrees Fahrenheit. These gases are heated using gaseous fuel, such as natural gas, which is supplied to the burners 42, to ignite and burn the gaseous fuel and to simultaneously heat the gases drawn from the delacquering chamber 30 in the hot gas generator 43. The recirculation fan 44 then directs the hot exhaust gases exiting the hot gas generator 43 into a cylindrical steel duct manifold 46 positioned above the burners 42 and horizontally next to the top of the furnace 10 above the delacquering chamber 30 (see FIG. 4). The manifold 46 directs the hot exhaust gases from the burners 42 into three smaller cylindrical steel ducts 48 that extend in a parallel fashion over the top of the delacquering chamber 30 above the floor 34. A series of even smaller cylindrical steel ducts 50 extend from each of the ducts 48 downward into and through the top of the delacquering chamber 30, such that the hot exhaust gases are directed downward into the chamber 30 and onto the scrap aluminum A positioned on the floor 34 of the chamber 30.

As can be seen from FIG. 3, a diagonal channel 52 running through the wall 30B connects the creek bed 40 to a second chamber 54 behind the wall 30B. This second chamber 54, having dimensions of approximately twenty feet wide and twenty feet long, is known as the "melt chamber" or "heating chamber" where the scrap aluminum A is fully melted and forms a pool of molten metal. A set of various gas fueled burners 56 direct heated exhaust gases through their associated cylindrical refractory ducts 58 into the heating chamber 54 to melt the aluminum in the chamber 54. The burners 56 help elevate the temperature in the heating chamber 54 to over 2,000 degrees Fahrenheit.

A rear gate 60 provides access to the heating chamber 54 for various activities, such as for example repairs, maintenance, upgrades, and cleaning. An electric lift motor 90 and associated lift gears 92, are positioned above the rear door 60 atop the rear end 14 of the furnace 10. A set of heavy chains 94 attach at one end to the top of the door 60 and attach at the other end to the lift gears 92. The motor 90, lift gears 92 and chains 94 collectively form an opening system 96 for the door 60. The computer control system for the furnace 10 operatively communicates with the opening system 96 to controllably raise and lower the door 60 between its closed position (as depicted in FIG. 1 and denoted in FIG. 2 as "CLOSED"), in which the door 60 rests against and seals the rear doorway, and its open position in which the door 60 fully exposes the rear doorway (as depicted and denoted in FIG. 2 as "OPEN").

A channel 62, positioned at the bottom of a sidewall 64 of the heating chamber 54 provides a path for molten aluminum to exit the heating chamber 54 for removal from the furnace 10.

As can be appreciated, Applicants' aluminum recycling system or furnace 10 utilizes a multi-step process. First, bulk loads or bails of coated aluminum scrap A are fed into the furnace's coated scrap hearth or delacquering chamber 30 through the full-width hearth doorway 18 when the door 16 is in its raised or "OPEN" position. The burners 42 heat the hot gases to approximately 1000 Deg. F. and the recirculation blower 44 forces these hot gases down upon the pile of coated scrap aluminum A positioned on the floor 34 of the delacquering chamber 30. These hot gases are introduced into the delacquering chamber 30 above the coated scrap aluminum A. As the scrap aluminum A moves from the doorway 18 to the creek bed 40 across the floor 34, the organics and other non-metal particulates (i.e., the "VOC's") volatilize and are drawn into the vacuum hood 70 above the creek bed 40.

After the VOC's have been removed from the scrap aluminum A in the delacquering chamber 30, the scrap aluminum drops into the creek bed 40, where it joins a flow of molten aluminum recirculating from the heating/melt chamber 54. The molten aluminum in the creek bed 40 circulates into the heating chamber 54 through the channel 52 in the rear sidewall 30B of the chamber 30. The molten aluminum is heated in the heating chamber 54 by the heat generated by various heat sources, including the burners 56. A portion of the melted aluminum in the heating chamber 54 is allowed to exit the furnace 10 through the channel 62 for removal from the system 10, while another portion of the melted aluminum is returned to the creek bed 40 by a molten metal recirculating system R (see FIG. 3).

Referring again to FIG. 2, an eductor vacuum hood 70 is positioned directly above and open to the creek bed 40 below. The hood 70 is approximately twenty feet wide, eight feet tall and ten feet deep. Two matching eductor systems 72 are integrated into the hood 70. More particularly, each of the eductor systems 72 has a circular gas suction port 74, a cylindrical refractory gas mixing chamber 76, a cylindrical motive gas tube 78, a cylindrical refractory gas discharge port 80, a variable speed blower 86, and a downstream pilot burner 89 which acts as an igniter. The gas suction port 74, gas mixing chamber 76, motive gas tube 78, and discharge port 80, may be collectively referred to as an "eductor 72E".

The gas suction port 74, motive gas tube 78, and gas discharge port 80 all open into the gas mixing chamber 76 as shown. The motive gas tube 78 has a diameter that is substantially smaller than the diameter of the mixing chamber 76, such that a length of the motive gas tube 78 can be readily positioned inside of the mixing chamber 76. The motive gas tube 78 enters the topside of the mixing chamber 76 where it then turns 90 degrees in the center of the mixing chamber 76 to point downstream away from the gas suction port 74.

Each of the gas suction ports 74 extend through the rear sidewall of the hood 70 to provide a path for exhaust gases and VOC's collected in the hood 70 to be drawn into the eductor mixing chambers 76. A pair of cylindrical steel exhaust channels or ducts 82 connect their respective circular gas discharge ports 80 to the melt chamber 54 and enter the melt chamber 54 through complementary circular openings 84 in the ceiling of the melt chamber 54. Each variable speed blower 86, which is associated with an eductor system 72, is attached to the top of the hood 70 and acts as a gas flow regulator by directing a motive gas into the blower's associated motive gas tube 78, and thereby into the corresponding gas mixing chamber 76, where the motive gas combines with gases from the exhaust hood 70 to form a motive gas mixture. The composition of the motive gas can vary depending upon the design and intended operation of the eductor system 72. That is, the motive gas may be a single type of gas, such as for example Nitrogen, or a mixture of gases, such as for example, the atmosphere proximate the blower 86. Alternatively, the motive gas can be drawn from within the furnace 10, such as for example the melt chamber 54.

As explained, Applicants' aluminum recycling system 10 utilizes a multi-step process. First, bulk loads or bails of coated aluminum scrap A are fed into the furnace's coated scrap hearth or delacquering chamber 30 through the full-width hearth doorway 18. The burners 42 heat the hot gasses to approximately 1000 Deg. F and the recirculation blower 44 forces these hot gasses down upon the pile of coated scrap aluminum A positioned on the floor 34 of the delacquering chamber 30. These hot gases are introduced into the delacquering chamber 30 above the coated scrap aluminum A. As the scrap aluminum A moves from the doorway 18 to the creek bed 40 across the floor 34, the organics and particulates (the "VOC's") begin to volatilize and are drawn into the vacuum hood 70 by the eductor systems 72, which are initially running at a minimum speed.

After the VOC's have been removed from the scrap aluminum A in the delacquering chamber 30, the scrap aluminum drops into the creek bed 40, where it joins a flow of molten aluminum from the heating/melt chamber 54. The molten aluminum in the creek bed 40 circulates into the heating chamber 54 through the channel 52 in the rear sidewall 30B of the chamber 30. The molten aluminum is heated in the heating chamber 54 by the heat generated by the burners 56 and by the heat provided from the eductor systems 72. A portion of the melted aluminum in the heating chamber 54 is allowed to exit the furnace 10 through the channel 62 for removal from the system, while another portion of the melted aluminum is returned to the creek bed 40 by a recirculating system R.

Based on what the operating conditions in the delacquering chamber 30 and the exhaust hood 100 of the furnace 10 dictate, the blowers 86 for each of the two eductor systems 72 can be ramped up to higher running speeds in order to increase the flow of motive gases into the motive gas tubes 78, which thereby increases the venturi effect in the mixing chambers 76, which in turn increases the vacuum draw in the inlet ports 74 to increase the draw of exhaust gases and VOC's from the hood 70 and/or from the exhaust hood 100 through the eductor systems 72 and into the heating chamber 54. The VOC's drawn into the eductor systems 72 mix with the vacuum combustion air provided by the blowers 86 through the motive gas tubes 78, and are ignited by pilot burners (not shown) located at the discharge end of the eductors, i.e., proximate the gas discharge ports 80. These ignited gases and VOC's "fire down" onto the molten aluminum/metal bath of the heating chamber 54.

Figure 7:
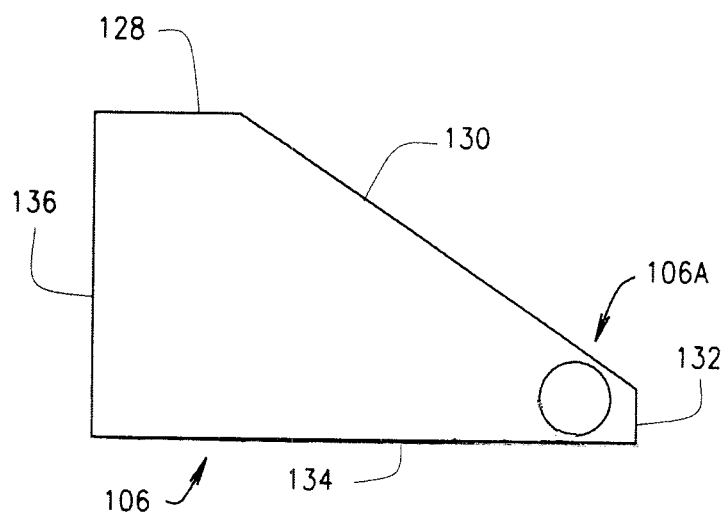
FIG. 7 is a side view of a side plate of the exhaust hood overflow system of FIG. 5.
Figure 8:
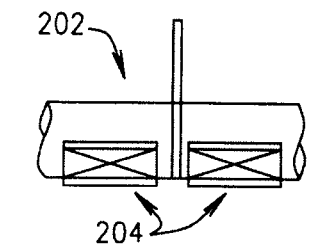
FIG. 8 is an underside view of a portion of the front duct of the first embodiment of the exhaust hood overflow system of FIG. 5.
Figure 9:
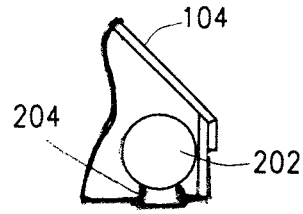
FIG. 9 is a cross-sectional side view of the portion of the front duct of FIG. 9.
Figure 10:
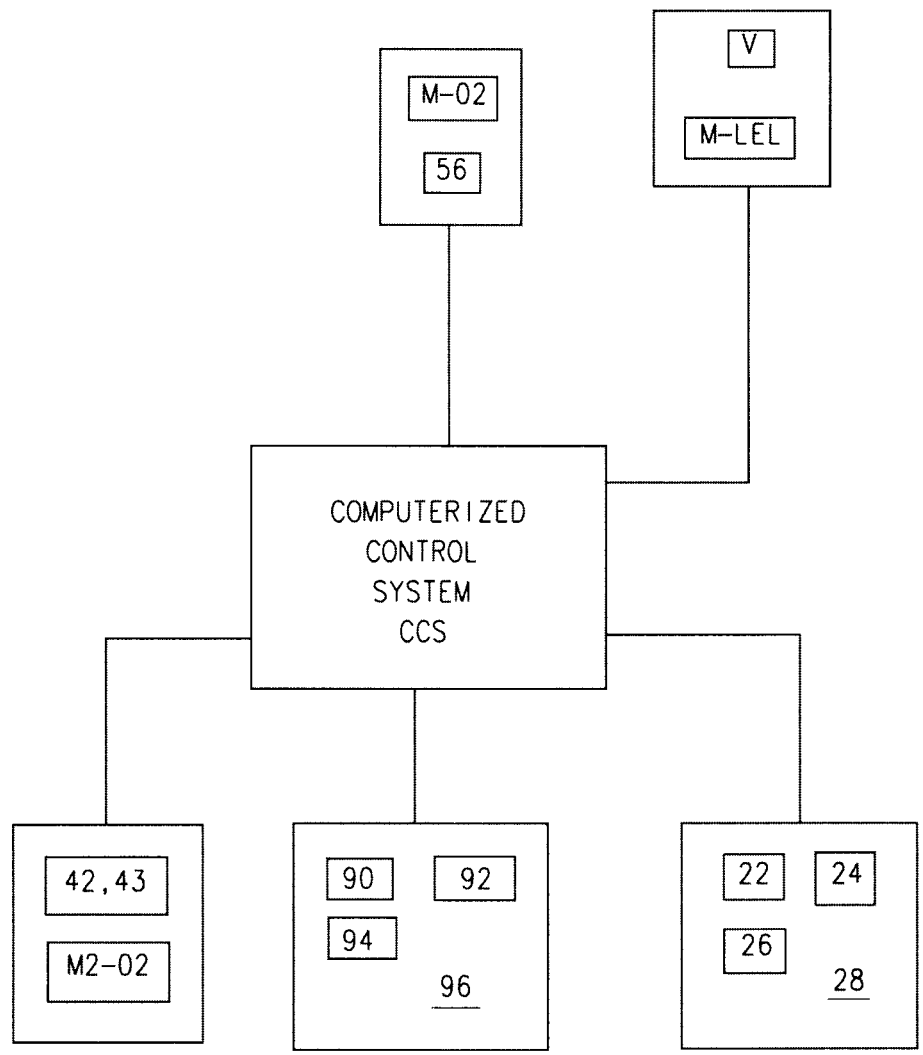
FIG. 10 is a schematic computer system flow chart of the computer control system for the furnace of the present disclosure in association with various system control loops.

An Oxygen monitor M-O2 (see FIG. 7; not shown in FIGS. 1-6) positioned in the exhaust flue for the heating chamber 54 continually monitors Oxygen levels evacuating the chamber 54 and communicates its readings to the computer control system CCS. The CCS adjusts and controls the air/gas ratio of the heating chamber burners 56 to ensure the burning of any residual VOC's before such VOC's exit the chamber 54.

Further, another Oxygen monitor M2-O2 positioned in the hood 70 continually monitors Oxygen levels in the hood 70 over the creek bed 40, generates an electric signal indicative of the Oxygen level in the hood 70, and communicates that electronic signal to the computer control system CCS. This 4-20 mA electric signal reflects a range of 0% to 21% Oxygen. The Oxygen level in the delacquering chamber 30 will have a predetermined "low O2" set-point between 0-6% to prevent combustion from occurring in the delacquering chamber 30. The burner fuel-mix ratios for each of the burners 42 in the hot gas generator 43 are adjusted and controlled by the computer control system CCS based upon the Oxygen level measured in the hood 70 by the monitor M2-O2, so as to maintain a desired Oxygen level within the delacquering chamber 30. Programmed limits will prevent the burners 42 from firing outside of acceptable Oxygen ratio limits.

Finally, a lower explosive limit ("LEL") monitor M-LEL, located in the delacquering chamber 30, detects the explosive level of the atmosphere within the delacquering chamber 30, and communicates that LEL level to the computer control system CCS. In the event that the LEL reading exceeds a predetermined "safe" level, the computer control system CCS recognizes an alarm state in the furnace 10 and opens an electronically controlled gas shut-off valve V connected to a Nitrogen supply line attached to the furnace 10, so as to automatically inject Nitrogen gas into the delacquering chamber 30 to reduce the LEL level and minimize the risk of explosion in the chamber 30. The Nitrogen gas is injected through an inlet gas port N proximate the recirculation blower 44. This results in generally even distribution of Nitrogen gas throughout the entire delacquering chamber 30. Of course, the Nitrogen can be injected at nearly any position in the system so long as sufficient Nitrogen reaches the chamber 30 to rapidly compensate for an excessive LEL reading. Of course, other neutral gases or neutral gas mixtures can be used in place of Nitrogen. When such an event occurs, the furnace doors 16 and 60 will both be automatically locked by the computer control system CCS during such high LEL event, and will not be allowed to open until the LEL reading has been reduced to a safe level.

Referring now to FIGS. 5-9, it can be seen that the furnace 10 has a front door exhaust hood 100 positioned generally above and across the furnace's front doorway 18. The exhaust hood 100 has a horizontal, generally flat and rectangular sheet metal top 102, a generally flat and rectangular sheet metal sloping face 104 attached to and descending in a sloping manner downward from the top 102, two matching vertically-oriented generally flat and generally trapezoidal sheet metal side plates 106, and a generally flat vertically-oriented rectangular front face 108. The side plates 106 are each attached along the full lengths of their upper edges to, and descend vertically downward from, the top 102 and the sloping face 104. The front face 108 is attached along the full length of its upper edge to, and descends vertically downward from, the bottom edge of the sloping face 104. The top 102, the sloping face 104, and the front face 108, all have lateral ribs 103 for structural rigidity. The top 102, sloping face 104, side plates 106, and front face 108, are all constructed of a corrosion-resistant metal or have corrosion resistant surface coatings.

The top 102 is approximately thirty feet (30') wide and three foot two inches (3' 2") deep. The top 102 has a linearly horizontal rear edge 110, a linearly horizontal front edge 112 opposite and generally parallel to the rear edge 110, and two linearly horizontal and parallel side edges 114 and 116 at each end of the top 102. Similarly, the sloping face 104 has a linearly horizontal upper edge formed by the front edge 112 of the top 102, a linearly horizontal lower edge 122 opposite and generally parallel to the edge 112, and two linearly horizontal and parallel side edges 124 and 126 at each end of the sloping face 104 that extend from the upper edge 120 to the lower edge 122. The front face is approximately thirty feet (30') wide and nine feet (9') across from the upper edge 120 to the lower edge 122.

Each of the matching end plates 106 (see FIG. 7) has a horizontal upper edge 128, a sloping edge 130, a vertical front edge 132, a horizontal lower lip 134, and a vertical rear edge 136. The front edge 132 is parallel to the rear edge 136, and the upper edge 128 is parallel to the lower lip 134. The front edge 132 is substantially shorter than the rear edge 136, and thereby defines the slope of the sloping edge 130. The length of the top edge 128 matches the width of the top 102, and the length of the sloping edge 130 matches the width of the sloping face 104. A circular opening 106A is cut in each side plate 106 in the nook formed by the intersections of the edges 130, 132 and 134.

Returning to FIGS. 5 and 6, the front plate 108 is approximately thirty feet (30') wide and one foot tall. The lower edge 122 of the sloping face 104 defines the upper edge of the front plate 108. The front plate 108 has a horizontal lower lip 123 that runs opposite and generally parallel to the rear edge 110, and two linearly horizontal and parallel side edges 125 and 127.

A generally flat sheet metal shroud or skirt 129 drapes or extends vertically downward approximately two feet from each of the lower lips 123 and 134. The skirt 129 further encapsulates gases and VOC's escaping from the furnace 10 through the doorway 18, and direct them into the hood 100.

The rear edge 110 of the top 102 is secured to and sealed against the front face of the furnace 10, approximately ten feet above and generally centered on the doorway 18. The rear edge 110 seals against the furnace 10 above and approximately five feet to each side of the doorway 18. The sloping face 104 uniformly slopes downward away from the top 102 at an angle of approximately 45 degrees such that the lower edge 122 is positioned approximately one to two feet above and extends horizontally across the front of the doorway 18 at a distance of approximately eight feet.

As can be appreciated, the combination of the top 102, the sloping face 104 and the side plates 106, all attached and configured in this manner forms a collection zone the doorway 18 for exhaust fumes that escape the furnace 10. A set of three duct ports 140 open into the sloping face 104 and connect to a set of three respective exhaust ducts 142 that direct exhaust fumes from under the hood 100 into an exhaust manifold 144 positioned above the sloping face 104. The exhaust manifold 144 is connected to an exhaust duct 146 to draw the exhaust fumes away from the furnace 10.

The exhaust hood overflow system 200, which is integrated in part into the exhaust hood 100, includes a tubular metal gas collection apparatus or manifold 202 positioned horizontally along the inner surface of the sloping face 104 under the hood 100 proximate the front face 108 and just above the lower edge 122. The manifold 202 is approximately eighteen inches (18") in diameter and runs the entire length of the lower edge 122. The manifold 202 fits snugly though the openings 106A in each of the side plates 106, and a high temperature sealant is applied around the manifold 202 where it passes through the openings 106A to create a gaseous seal. A series of eight rectangular gas inlets or gates 204 are integrated into the side of the manifold 202. Each of the inlets 204 comprises one or more openings into to the manifold 202. The inlets 204 are spaced apart along the length of the manifold 202 and are oriented to face into the underside of the hood 100. The shapes and sizes of the inlets 204 can vary to accommodate particular hood overflow configurations and designs.

One end of the manifold 202, after passing out from under the hood 100 through opening 106A in its respective side plate 106, opens into an exhaust duct 206. The exhaust duct 206 extends along the side and top of the furnace 10, and connects to the inlet for one of the variable speed eductor blowers 86 near the middle of the top of the furnace 10. Similarly, the opposite end of the manifold 202, after passing out from under the hood 100 through opening 106A in its respective side plate 106, opens into an exhaust duct 208. The exhaust duct 208 extends along the opposite side and along the top of the furnace 10, and connects to the inlet for a second of the variable speed eductor blowers 86 near the middle of the top of the furnace 10. The blowers 86 create a vacuum in the exhaust ducts 206 and 208 that extends into the exhaust manifold 202. This vacuum enables the exhaust manifold 202 to draw off exhaust gasses, including VOC's, from under the hood 100 near the lower edge 122 of the sloping face 104 and direct them into the eductors 72 to be used as motive gases in the furnace 10. As can be appreciated, the overflow system 200 helps reduce the possibility that these gases and VOC's, collecting near the bottom of the hood 100, would otherwise overwhelm and overflow the hood 100.

While we have described in the detailed description a configuration that may be encompassed within the disclosed embodiments of this invention, numerous other alternative configurations, that would now be apparent to one of ordinary skill in the art, may be designed and constructed within the bounds of our invention as set forth in the claims. Moreover, the above-described novel exhaust hood overflow system 200 for a metal recycle furnace 10 of the present invention can be arranged in a number of other and related varieties of configurations without expanding beyond the scope of our invention as set forth in the claims.

The system 200 may further comprise an automated subsystem to control the glow of exhaust gases from under the hood 100 through the system 200. Such automated subsystems may include for example, a set of mechanical gears linked to gas valves at the inlets 204 and that interface with the door 16. Such gears open the inlets 204 when the door 16 is in its OPEN condition (or at least not in its fully CLOSED condition), and close the inlets 204 when the door 16 is in its CLOSED condition.

In yet another configuration, a gas regulator 300 (see FIG. 6) may be added to the system 200, such as for example a gate valve or other similar device, to automatically dilate or constrict the flow of gas through the system 200, including in the conduits 206 and 208, and in proximity to the inlet 204. The operation of such regulators 300 can be accomplished by a variety of means. For example, a mechanical or electronic positional sensor (depicted by way of example as 302 in FIG. 6) can be used to detect the position of the door 16, and send an electronic signal to a dedicated electronic controller or the computer control system CCS to communicate the door position. The dedicated electronic controller or the computer control system CCS then responds to the electronic signal to automatically dilate or open the regulators 300 when the door 16 is in its OPEN condition (or at least not in its fully CLOSED condition), or constrict or close the regulators 300 when the door 16 is in its CLOSED condition.

Alternatively, such automated operation of the exhaust hood overflow system 200 can be accomplished by controllably operating the blower 86 or a similar gas blower or vacuum device that is positioned along the gas conduit exiting the manifold 202, such as the exhaust duct 206 or the exhaust duct 208. That is, when a positional sensor (such as 302 in FIG. 6) determines that the door is in its OPEN condition (or at least not in its fully CLOSED condition), the sensor can generate an electronic signal that indicates such door position, and communicates that electronic signal to a dedicated electronic controller or the computer control system CCS. In response to the electronic signal, the dedicated electronic controller or the computer control system CCS turns ON or increases the operational flow rate of the blower 86. When such sensor determines that the door is in its CLOSED condition, the blower 86 can be instructed by the electronic controller (or the computer control system CCS) to turn OFF or decrease its flow rate.

In yet another alternative, an electronic volatiles sensor (shown by way of example as 304 in FIG. 6), positioned under the hood 100, can communicate with a dedicated electronic controller or the computer control system CCS in communication with the blower 86. When the volatiles sensor detects volatiles accumulating under the hood 100 that exceed a predetermined level, the sensor will send an electronic signal to the electronic controller (or the computer control system CCS), and the controller (or CCS) will in response turn ON or increase the operational flow rate of the blower 86. When the volatiles sensor detects the volatiles level drops below such predetermined level, the sensor will either cease its prior electronic signal or send a new electronic signal to the electronic controller (or CCS), and the controller will in response turn OFF or decrease the operational flow rate of the blower 86.

By way of further example, the exhaust hood overflow system 200 is not necessarily required to be installed in an aluminum delacquering and recycling system 10 as depicted in FIGS. 1-5, but may be installed or otherwise incorporated into a variety of configurations of metal recycling furnace and kiln systems. Further, the exhaust hood overflow system 200 is not constrained to the specific eductor system 72 configuration as shown in this disclosure, but may instead comprise various shapes, sizes and may be located at different positions on the furnace 10, so long as the eductor(s) adequately perform the function of controllably removing exhaust gases and VOC's from the exhaust hood 100, igniting those gases and VOC's, and directing that heat into the melt chamber 54. Similarly, it is not required that the exhaust hood overflow system 200 be equipped with exactly two eductors. Rather, the exhaust hood overflow system 200, and for that matter other furnaces and kiln using the unique system presented here, may incorporate various numbers of eductors, so long as the eductor(s) adequately perform the function of controllably removing exhaust gases and VOC's from the exhaust hood 100, igniting those gases and VOC's, and directing that heat into the melt chamber 54.

In addition, the exhaust hood overflow system 200 can be operated or controlled by a variety of methods and control systems, so long as the eductor(s) adequately perform the function of controllably removing exhaust gases and VOC's from the exhaust hood 100, igniting those gases and VOC's, and directing that heat into the melt chamber 54. That is, the exhaust hood overflow system 200 can be controlled by mechanical and/or electronic and/or computerized control systems. For example, the exhaust hood overflow system 200 can be controlled by a preset or programmable computer ("CPU") that is connected to monitors, such as for example the one or more of the system's oxygen monitors, and to controllable components, such as for example the variable speed blower 86, such that the CPU can collect operational data from the monitor(s), and input that data into a program in the CPU to automatically control the speed of the blower 86 to predictably control the amount of exhaust gases and VOC's pulled into the eductor systems 72 from the exhaust hood 100.

Further, each eductor system 72 can be independently controlled by on "onboard" system or by a remote system, or multiple eductors can be controlled by a common control system. Such electronic and/or computerized control systems can be connected to the eductor(s) by hardwire or wirelessly. Also, the variation in gas flow through the eductor system 72 can be achieved through methods other than changing the speed of the variable speed blower 86. For example, a variable nipple can be attached to the end of the motive gas tube 78, or a mass flow controller or a controllable gate valve can be placed in any one or more of the inlet port 74, the mixing chamber 76, the motive gas tube 78, or the gas discharge port 80. Of course, any one or more of these types of controllers can be connected to and operated by the CPU or by the computer control system CCS for the furnace 10.

By way of further example, various gas propulsion devices other than the blower 86 can be used to draw the exhaust fumes into the manifold 202 and through the system 200, including for example various gas pumps, blowers, and fans. Further, the system 200 can utilize more than one gas propulsion device. Moreover, the system 200 is not limited to directing the exhaust gases into an eductor gas circulating system, but can be configured to urge the exhaust gases removed from under the hood 100 into various other chambers or components of the furnace 10.

Additional variations or modifications to the configuration of the above-described novel exhaust hood overflow system for a metal recycle furnace 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. An exhaust hood overflow system for a metal melt furnace, said furnace having a volatizing chamber, said furnace having a doorway with a door opening into said volatizing chamber and an exhaust hood positioned proximate said doorway, said door having a CLOSED condition said door is sealed against said doorway and an OPEN condition when said door is not sealed against said doorway, said exhaust hood having a lower lip with a portion separated from said doorway, said exhaust hood overflow system comprising:
   a. A gas manifold having a gas inlet, said gas manifold positioned at least in part under said exhaust hood with said gas inlet positioned proximate said exhaust hood lower lip separated portion;
   b. A gas port opening into said furnace;
   c. A gas conduit providing gaseous communication between said gas manifold and said gas port;
   d. A gas blower operatively associated with said gas collection apparatus, said gas blower drawing gas from said gas manifold and urging said gas through said gas conduit, and into said furnace through said gas port;
   e. An electronic sensor positioned proximate said hood, said electronic sensor detecting a possible gas overflow condition under said hood, said electronic sensor generating an electronic signal indicative of said condition; and
   f. An electronic controller operatively associated with said gas blower and with said electronic sensor, said electronic controller adapted to operate said gas blower, said electronic controller receiving said electronic signal from said electronic sensor and turning on said gas blower in response to said electronic signal when said electronic signal indicates a possible gas overflow condition.

2. The exhaust hood overflow system of claim 1, wherein said electronic sensor is positioned proximate said hood lower lip and comprises a volatiles sensor, said volatiles sensor being positioned under said exhaust hood, said volatiles sensor measuring the concentration of volatiles under said exhaust hood, generating an electronic signal indicative of said concentration of volatiles, and communicating said signal to said electronic controller, said electronic controller turning on said gas blower in response to said electronic signal when said electronic signal indicates a level of volatiles under said exhaust hood that exceeds a predetermined level, said electronic controller turning off said gas blower in response to said electronic signal when said electronic signal indicates a level of volatiles under said hood that is below said predetermined level.

3. The exhaust hood overflow system of claim 1, wherein said electronic sensor detects when said furnace door is in its OPEN condition and generates an electronic signal indicative of said condition and communicates said electronic signal to said electronic controller, said electronic controller turning on said gas blower in response to said electronic signal when said electronic signal indicates said furnace door is in its OPEN condition.

4. The exhaust hood overflow system of claim 1, wherein said furnace further comprises a heated chamber, said heated chamber being separate from said volatizing chamber, and said exhaust port opens into said heated chamber.

5. The exhaust hood overflow system of claim 4, wherein said furnace further comprises an eductor circulation system and said gas blower urges said gases from said gas collection apparatus into said eductor circulation system.

6. The exhaust hood overflow system of claim 1, wherein said gas blower has a variable speed, and said electronic controller increases the speed of said gas blower when said electronic signal from said electronic sensor indicates a gas overflow condition.

7. An exhaust hood overflow system for a metal melt furnace, said furnace having a volatizing chamber, said furnace having a doorway with a door opening into said volatizing chamber and an exhaust hood positioned proximate said doorway, said door having a CLOSED condition said door is sealed against said doorway and an OPEN condition when said door is not sealed against said doorway, said exhaust hood having a lower lip with a portion separated from said doorway, said exhaust hood overflow system comprising:
   a. A gas flow path for a flow of gas from under said hood, said gas flow path comprising a gas manifold, a gas port opening into said furnace and a gas conduit providing gaseous communication between said gas manifold and said gas port, said gas manifold having a gas inlet, said gas inlet having a closable opening, said gas manifold being positioned at least in part under said exhaust hood with said gas inlet positioned proximate said exhaust hood lower lip separated portion;
   b. A gas blower positioned in said gas flow path, said gas blower drawing gas through said gas inlet and into said gas manifold from under said hood, and urging said gas through said gas conduit and into said furnace through said gas port;
   c. A gas flow regulator, said gas flow regulator positioned in said gas flow path, said regulator being adapted to dilate and to constrict said gas flow through said gas flow path;
   d. A sensor, said sensor detecting when said door is in its OPEN condition; and
   e. A controller operatively associated with said gas flow regulator and with said sensor, said controller instructing said gas flow regulator to dilate said gas flow when said sensor detects said door in said OPEN condition.

8. The exhaust hood overflow system of claim 7, further comprising an electronic sensor associated with said furnace door, said sensor detecting when said furnace door is in its OPEN condition and generating an electronic signal indicative of said condition, said controller comprising an electronic component, said electronic component receiving said electronic signal from said electronic sensor and instructing said gas flow regulator to dilate said gas flow in response to said electronic signal when said electronic sensor detects said door in said OPEN condition.

9. The exhaust hood overflow system of claim 7, wherein said controller instructs said regulator to constrict said gas flow when, after instructing said regulator to dilate said gas flow, said sensor no longer detects said door in said OPEN condition.

10. The exhaust hood overflow system of claim 7, further comprising an electronic volatiles sensor, said volatiles sensor measuring the concentration of volatiles under said exhaust hood, generating an electronic signal indicative of said concentration of volatiles, said controller comprising an electronic component, said electronic component receiving said electronic signal from said volatiles sensor and instructing said gas flow regulator to dilate said gas flow in response to said electronic signal when said electronic signal indicates a level of volatiles under said exhaust hood that exceeds a predetermined level, said electronic component instructing said gas flow regulator to constrict said gas flow in response to said electronic signal when said electronic signal indicates a level of volatiles under said hood that is below said predetermined level.

11. The exhaust hood overflow system of claim 7, wherein said furnace further comprises a heated chamber, said heated chamber being separate from said volatizing chamber, and said exhaust port opens into said heated chamber.

12. The exhaust hood overflow system of claim 10, wherein said furnace further comprises an eductor circulation system and said gas blower urges said gases from said gas collection apparatus into said eductor circulation system.

13. An exhaust hood overflow system for a metal recycling furnace, said furnace having a volatizing chamber and a heating chamber separated from said volatizing chamber, said furnace having a eductor gas circulation system with a variable speed gas blower collecting furnace exhaust gases from said volatizing chamber and directing said exhaust gases into said heating chamber, said furnace having a doorway opening into said volatizing chamber with an exhaust hood positioned proximate said doorway, said door having a CLOSED condition in which said door is sealed against said doorway and an OPEN condition in which said door is not sealed against said doorway, said hood having a lower lip with a portion separated from said doorway, said exhaust hood overflow system comprising:
   a. A gas manifold having a gas inlet, said gas manifold positioned at least in part under said exhaust hood with said gas inlet positioned proximate said exhaust hood lower lip separated portion;
   b. A gas conduit providing gaseous communication between said gas manifold and said eductor gas circulation system; and
   c. Said eductor gas circulation system blower drawing gas through said gas inlet and into said gas manifold from under said exhaust hood, and urging said gas through said gas conduit and into said eductor gas circulation system.

14. The exhaust hood overflow system of claim 13, further comprising an electronic sensor operatively associated with said furnace door and an electronic controller operatively associated with said blower and said electronic sensor, said electronic controller adapted to adjust the operational speed of said blower, said electronic sensor detecting when said furnace door is in its OPEN condition and generating an electronic signal indicative of said condition, said electronic controller receiving said electronic signal from said electronic sensor and increasing the operational speed of said gas blower when said sensor detects said door in said OPEN condition.

15. The exhaust hood overflow system of claim 14, wherein said controller decreases the operational speed of said gas blower when, after increasing the operational speed of said gas blower, said electronic sensor no longer detects said door in said OPEN condition.

16. The exhaust hood overflow system of claim 13, further comprising an electronic volatiles sensor, said volatiles sensor measuring the concentration of volatiles under said exhaust hood and generating an electronic signal indicative of said concentration of volatiles, said electronic controller receiving said electronic signal from said volatiles sensor and increasing the operational speed of said gas blower in response to said electronic signal when said electronic signal indicates a level of volatiles under said exhaust hood that exceeds a predetermined level, said electronic controller decreasing the operational speed of said gas blower in response to said electronic signal when said electronic signal indicates a level of volatiles under said exhaust hood that is below a predetermined level.

17. The exhaust hood overflow system of claim 13, further comprising a gas flow regulator operatively associated with an electronic controller and positioned in one of said gas manifold and said gas conduit, said electronic controller controlling said regulator to dilate or constrict the flow of gas flowing through said one of said gas manifold and said gas conduit.

18. The exhaust hood overflow system of claim 17, further comprising an electronic sensor operatively associated with said furnace door and said electronic controller, said electronic sensor detecting when said furnace door is in its OPEN condition and generating an electronic signal indicative of said condition, said electronic controller receiving said electronic signal from said electronic sensor and instructing said regulator to dilate said gas flow in response to said electronic signal when said electronic sensor detects said door in said OPEN condition.

19. The exhaust hood overflow system of claim 18, wherein said electronic controller instructs said regulator to constrict said gas flow when, after instructing said regulator to dilate said gas flow, said electronic sensor no longer detects said door in said OPEN condition.

20. The exhaust hood overflow system of claim 17, further comprising an electronic volatiles sensor, said volatiles sensor measuring the concentration of volatiles under said exhaust hood and generating an electronic signal indicative of said concentration of volatiles, said electronic controller receiving said electronic signal from said volatiles sensor and instructing said regulator to dilate said gas flow in response to said electronic signal when said electronic signal indicates a level of volatiles under said exhaust hood that exceeds a predetermined level, said electronic controller instructing said regulator to constrict said gas flow in response to said electronic signal when said electronic signal indicates a level of volatiles under said exhaust hood that is below a predetermined level.

* * * * *